3,041,381
PROCESS FOR THE OXIDATION OF SATURATED CYCLIC HYDROCARBON
Yoshiharu Matsubara, Fukiai-ku, Kobe, Yoshiteru Heya, Higashinada-ku, Kobe, and Hitoshi Aizawa, Fukiai-ku, Kobe, Japan, assignors to Saisei Camphor Co., Ltd., Kobe, Japan, a corporation of Japan
No Drawing. Filed Aug. 24, 1959, Ser. No. 835,399
9 Claims. (Cl. 260—610)

This invention relates to a process for the oxidation of saturated cyclic hydrocarbons, which comprises causing a saturated cyclic hydrocarbon, for example, saturated terpene hydrocarbons such as p-menthane, pinane, camphane, hydrogenated terpene hydrocarbon dimers, etc. and naphthene hydrocarbons such as isopropyl cyclohexane, 1,4-dimethyl cyclohexane etc. to contact with molecular oxygen or an oxygen-containing gas at an elevated temperature to produce a hydroperoxide of the saturated cyclic hydrocarbon. The object of the present invention is to increase the rate of oxidation of the saturated cyclic hydrocarbon to its hydroperoxide by minimizing the formation of the main by-products, i.e. oxocarboxylic acids and oxo-compounds, and facilitate the production of hydroperoxides of the saturated cyclic hydrocarbons economically.

Heretofore, the following method has been proposed as a process for the production of hydroperoxides of saturated cyclic hydrocarbon in which a saturated cyclic hydrocarbon is treated with molecular oxygen. Namely, according to the process disclosed in U.S. patent specification 2,751,417, oxygen is passed through a saturated hydrocarbon having tertiary carbon atom(s) in a liquid phase at temperatures ranging from about 40° to 125° C. in order to increase the tertiary hydroperoxide content to about 10%, and to the mixture there is added an activated catalyst which is a metal having an atomic number of 44~78 belonging to the group VIII of the periodic table, supported on a carrier such as carbon, alumina and the like, in an amount insufficient to promote any side reaction, in order to increase the rate of oxidation. However, the oxidation accelerator used in this method is expensive, and also it has been found as a result of subsequent tests that the oxidation must be carried out without the addition of the oxidation accelerator before the period when the tertiary hydroperoxide content reached to the extent of 10% as described above, if not, side reactions will be ready to occur, the purification after completion of the oxidation will be complicated, and it causes the loss in the starting material, which is disadvantageous economically.

We have now found that the desired object can be attained in a shorter time as compared with conventional methods by introducing molecular oxygen into a saturated cyclic hydrocarbon at temperatures ranging from 50° to 110° C. with the addition of a stabilized nickel, Raney nickel or any other Raney-type catalyst as an oxidation accelerator in the amounts varying from 0.05% to 1.0% based on the weight of the saturated cyclic hydrocarbon. Furthermore, as occasion demands an alkali such as ammonia, hydroxides, carbonates, bicarbonates or the like may be used in the reaction as the oxidation promoter.

As can be seen in the examples illustrated hereinafter, by employing a stabilized nickel, Raney nickel or any other suitable Raney-type catalyst in accordance with the present invention, the rate of production of hydroperoxide is increased markedly as compared with cases where these catalysts are not used. The stabilized nickel used as catalyst refers to a nickel supported on a diatomaceous earth carrier, and a Raney-type catalyst refers to a material obtained by combining nickel, cobalt, iron, copper and the like with a metal dissolvable by water, alkali and acid, such as, for example, aluminum, magnesium, silicon, and the like, to form a binary or ternary alloy which is then pulverized. When they are to be used in the process of the present invention, it is of course essential that these catalysts possess a very high degree of activity.

For this reason, it makes to elapse a long period of time to induce the oxidation reaction slowly without the addition of the oxidation accelerator. When the amount of hydroperoxide is increased to a certain extent, the oxidation accelerator is added to cause double the velocity of oxidation and reduce the duration of the oxidation reaction. On the contrary, according to the present invention, the accelerator for oxidation may be added at the start of the reaction without resorting to such uneconomical steps as mentioned above, and the activity of the oxidation accelerator can be exhibited freely from the very beginning. Furthermore, in the case of the oxidation of saturated terpene hydrocarbons, which are produced from unsaturated terpene hydrocarbons by hydrogenation, the oxidation can be fully achieved in a short period of reaction time by utilizing the residual active stabilized nickel, Raney nickel and some other Raney-type accelerators as used for the hydrogenation of unsaturated terpene hydrocarbons without filtering off them. Consequently this is another feature of the present invention.

According to the process of the present invention, the oxidation may be carried out at temperatures ranging from 50° to 110° C., preferably between 85° and 100° C., and the oxidation accelerator is suspended in a saturated cyclic hydrocarbon maintained at this temperature, which is then intimately contacted with an oxygen-containing gas. The amount of the oxidation accelerator used may vary generally from 0.01% to 5.0% based on the weight of the saturated cyclic hydrocarbon, but 0.1% by weight is sufficient. A quantity of the accelerator less than 0.05% by weight is not effective, while a quantity more than 1% by weight shows practically no difference in effect as compared with less than of it. If the amount should be too much, a tendency to increase side reactions will be observed. If temperature should be too high, there will also be an increase in side reactions; for example, at temperatures over 110° C., the rate of oxidation at the beginning of the reaction increases but the maximum point of hydroperoxide content will fall due to the increase of side reactions, and moreover the decrease in hydroperoxide content will be remarkable, after the maximum point is reached.

The side reactions mentioned in this specification and claims mean inclusive formation of secondary decomposition products of hydroperoxide (keto-carboxylic acids, ketones, epoxy compounds, etc.) that of secondary alcohols and ketones due to oxidation of secondary carbon atom(s) other than tertiary carbon atom(s) resulting from high temperature reaction, formation of unsaturated cyclic hydrocarbons, p-cymene and their hydroperoxides and decomposition products thereof resulting from dehydrogenation reaction caused by the addition of oxidation accelerator, polymerization of unsaturated cyclic hydrocarbons and other analogous reactions. When these reactions occur all together, it is impossible to give hydroperoxides of saturated cyclic hydrocarbons of high purity, and for this reason the temperature of the oxidation reaction, selection of oxidation accelerator and the amount of oxidation accelerator to be used are important factors for achieving the desired results.

The oxidation process according to this invention proceeds the same whether it is effected in the presence or absence of water. It may also be carried out in the emulsion state. As an emulsifying agent fatty acid soaps, resinate soaps, alkyl sulphate, alkyl aryl sulphonate and ionic and non-ionic surface activators etc. may be used with good results. Alkalis to be used as the oxidation promotor as occasion may demand include ammonia, sodium and potassium compounds in the form of hydroxides, carbonates, bicarbonates and the like, magnesium and calcium carbonates and the like. It is preferred to use an alkali metal compound in the aqueous solution, and it is desirable to use calcium and magnesium compounds in the absence of water.

To illustrate the manner in which the invention may be carried out, the following examples are given.

EXAMPLE 1

200 g. of p-menthane containing 2% of p-menthane hydroperoxide was put into a 300 ml. four-necked flask fitted with an agitator, thermometer, injection pipe of gas diffusion type and reflux condenser and oxygen gas was blown in through the injection pipe at the rate of 5 liters per hour with vigorous stirring while maintaining the temperature at 90° C. The samples of content were then taken out every five hours to measure the amount of hydroperoxide produced by means of the iodine method (C. O. Willits et al., Anal. Chem., 24, 785 (1952)) for the purpose of determining the rate of oxidation. The rate of oxidation is shown in the following Table I.

Table I

RATE OF OXIDATION OF p-MENTHANE TO p-MENTHANE HYDROPEROXIDE (EXPRESSED IN PERCENTAGE OF HYDROPEROXIDE)

| Period of reaction (h) | 5 | 10 | 15 | 20 | 25 | 30 | 35 | 40 |
|---|---|---|---|---|---|---|---|---|
| Amount of catalyst (percent by weight): | | | | | | | | |
| A none | 3.8 | 5.1 | 6.7 | 8.0 | 9.3 | 11.2 | 12.0 | 13.3 |
| (a) 0.1 | 8.0 | 11.6 | 16.0 | 24.3 | 29.0 | | | |
| (b) 0.2 | 8.2 | 13.9 | 18.1 | 26.7 | 31.5 | | | |
| (c) 1.0 | 9.3 | 20.0 | 23.5 | 25.8 | 26.1 | 26.2 | | |

NOTE.—Initial concentration of p-menthane hydroperoxide, 2%.

200 g. of p-menthane containing 2% of p-menthane hydroperoxide was put into the same apparatus as is mentioned above, and (a) 0.1%, (b) 0.2% and (c) 1.0%, respectively, of stabilized nickel based on the weight of said p-menthane were suspended therein. While maintaining the temperature at 90° C. with vigorous stirring, oxygen gas was blown in through the injection pipe at the rate of 5 liters per hour. The rate of oxidation was determined by measuring the amount of hydroperoxide produced according to the iodine method. The yield of hydroperoxide are respectively shown in columns (a), (b) and (c) in Table I.

As shown in Table I, the rate of oxidation in experiments (a) and (b) during the reaction period of up to 25 hours amounts to over 3 times as much as that of the case where no oxidation accelerator is added. In experiment (c) the rate of oxidation up to 10 hours amounts to 4 times as much, but after 10 hours it is gradually retarded and side reactions occur with formation of oxidation inhibitors, thus showing that the rate of oxidation is restrained. Consequently, in the case of experiment (c), it is more economical to discontinue oxidation at 10 hours after beginning of the reaction and concentrate the resulting p-menthane hydroperoxide under a high reduced pressure.

EXAMPLE 2

200 g. of p-menthane containing 2% of p-menthane hydroperoxide was put into the apparatus as in Example I, and 0.1% each of (a) Raney nickel and (b) Raney cobalt based on the weight of said p-menthane were suspended therein. While maintaining the temperature at 90° C. with vigorous stirring, oxygen gas was blown in at 90° C. with vigorous stirring, oxygen gas was blown in through the injection pipe at the rate of 5 liters per hour. A small amount of samples of the liquid contents were taken out every 5 hours, and the amount of hydroperoxide obtained was measured by the iodine method. A comparison was made with the case in which 0.1% by weight of stabilized nickel was used as oxidation accelerator, and the result thereof is shown in the following Table II.

Table II

RATE OF OXIDATION OF p-MENTHANE TO p-MENTHANE HYDROPEROXIDE (EXPRESSED IN PERCENTAGE OF HYDROPEROXIDE)

| Period of reaction (h) | 5 | 10 | 15 | 20 | 25 | 30 | 35 | 40 |
|---|---|---|---|---|---|---|---|---|
| Catalyst: | | | | | | | | |
| Stabilized nickel | 8.0 | 11.0 | 16.0 | 24.3 | 29.0 | | | |
| Raney nickel | 6.1 | 9.5 | 13.2 | 19.0 | 20.8 | 25.4 | 28.0 | 30.9 |
| Raney cobalt | 6.8 | 9.9 | 13.0 | 16.8 | 20.0 | 23.9 | 27.5 | 28.6 |

EXAMPLE 3

200 g. of pinane containing 2% of pinane hydroperoxide was put into the apparatus as in Example I, and 0.1% by weight of stabilized nickel was suspended therein. Oxygen gas was blown in through the injection pipe at the rate of 5 liters per hour with vigorous stirring while maintaining the temperature at 95° C. The rate of oxidation was determined by measuring every 5 hours the amount of hydroperoxide obtained. As in the case of p-menthane in Example I, it was about 3 times as much as that of the case wherein no oxidation accelerator was added.

EXAMPLE 4

Hydrogenated terpene dimer was put into the apparatus as in Example I, and 0.1% by weight of stabilized nickel was suspended therein. While maintaining the temperature at 100° C. with vigorous stirring, oxygen gas was blown in through the injection pipe at the rate of 5 liters per hour. The rate of oxidation was determined by measuring every 5 hours the amount of hydroperoxide produced. It was about 3 times as much as that of the case where no oxidation accelerator was added.

EXAMPLE 5

200 g. of isopropyl cyclohexane containing 2% of isopropyl cyclohexane hydroperoxide was put into the apparatus as in Example 1, and 0.1% by weight of stabilized nickel was suspended therein. While maintaining the temperature at 90° C. with vigorous stirring, oxygen gas was blown in through the injection pipe at the rate of 5 liters per hour. The rate of oxidation was determined by measuring every 5 hours the amount of hydroperoxide produced. It was about 3 times as much as that of the case where no oxidation accelerator was used.

EXAMPLE 6

200 g. of 1.4-dimethyl cyclohexane containing 2% 1.4-dimethyl cyclohexane hydroperoxide was put into the apparatus as in Example 1, and 0.1% by weight of stabilized nickel was suspended therein. While maintaining the temperature at 90° C. with vigorous stirring, oxygen gas was blown in through the injection pipe at the rate of 5 liters per hour. The rate of oxidation was determined by measuring every 5 hours the amount of hydroperoxide produced. It was about 3 times as much as that of the case where no oxidation accelerator was added.

We claim:
1. The process of preparing a tertiary hydroperoxide which comprises passing elementary oxygen through a saturated cyclic hydrocarbon having at least one tertiary carbon atom in liquid phase at a temperature between approximately 50° C. and 110° C. and in the presence of from 0.01% to 5.0%, based on the weight of said hydrocarbon, of a catalyst selected from the group consisting of nickel on a diatomaceous earth carrier, Raney nickel, Raney cobalt, Raney iron and Raney copper.

2. The process as in claim 1; wherein said saturated cyclic hydrocarbon is hydrogenated terpene dimer.

3. The process as in claim 1; wherein said temperature is between approximately 85° C. and 100° C.

4. The process as in claim 1; wherein said saturated cyclic hydrocarbon initially contains a maximum of 2% of the hydroperoxide thereof.

5. The process as in claim 4; wherein said saturated cyclic hydrocarbon is p-menthane.

6. The process as in claim 4; wherein said saturated cyclic hydrocarbon is pinane.

7. The process as in claim 4; wherein said saturated cyclic hydrocarbon is isopropyl cyclohexane.

8. The process as in claim 4; wherein said saturated cyclic hydrocarbon is 1.4-dimethyl cyclohexane.

9. The process of preparing a tertiary hydroperoxide which comprises passing elementary oxygen through a saturated cyclic hydrocarbon having at least one tertiary carbon atom in an aqueous emulsion state at a temperature between approximately 50° C. and 110° C. and in the presence of from 0.01% to 5.0%, based on the weight of said hydrocarbon, of a catalyst selected from the group consisting of nickel on a diatomaceous earth carrier, Raney nickel, Raney cobalt, Raney iron and Raney copper.

References Cited in the file of this patent

UNITED STATES PATENTS

| | | |
|---|---|---|
| 2,735,870 | Fisher et al. | Feb. 21, 1956 |
| 2,751,417 | Enos | June 19, 1956 |

OTHER REFERENCES

George: "Transactions Faraday Society," vol. 42 (1946), 210–16 (7 pages).